United States Patent [19]

Jäck

[11] Patent Number: 5,098,005

[45] Date of Patent: Mar. 24, 1992

[54] APPARATUS FOR WELDING SHEET-METAL PLATES

[75] Inventor: Kurt Jäck, Aulendorf, Fed. Rep. of Germany

[73] Assignee: Thyssen Industrie AG Maschinenbau, Fed. Rep. of Germany

[21] Appl. No.: 640,472

[22] Filed: Jan. 10, 1991

[30] Foreign Application Priority Data

Jan. 23, 1990 [EP] European Pat. Off. ............ 90101287

[51] Int. Cl.⁵ .................... B23K 26/00; B23K 26/02; B23Q 7/16; B65H 9/00
[52] U.S. Cl. .................................. 228/4.1; 228/49.4; 228/212; 228/49.1; 198/345.3; 271/250; 219/121.82; 29/784; 29/897.2; 29/464
[58] Field of Search ...................... 228/4.1, 49.2, 44.3, 228/212, 49.1; 29/897.2, 464, 793, 281.5, 430, 784; 198/345.3, 465.2, 465.3, 465.1, 803.01; 271/248, 250; 219/79, 104, 121.64, 121.82

[56] References Cited

U.S. PATENT DOCUMENTS

| | | | |
|---|---|---|---|
| 4,069,764 | 1/1978 | Teyssedre | 29/430 |
| 4,162,387 | 7/1979 | De Candia | 219/79 |
| 4,441,645 | 4/1984 | Takagishi et al. | 228/49.1 |
| 4,600,136 | 7/1986 | Sciaky et al. | 228/4.1 |
| 4,659,895 | 4/1987 | Di Rosa | 219/79 |
| 4,856,701 | 8/1989 | Pöckl | 219/79 |
| 4,944,445 | 7/1990 | Zimmer | 219/79 |

FOREIGN PATENT DOCUMENTS

| | | | |
|---|---|---|---|
| 57-71741 | 5/1982 | Japan | 198/465.2 |
| 60-108189 | 6/1985 | Japan | |
| WO84/03059 | 8/1984 | PCT Int'l Appl. | 219/121.64 |

Primary Examiner—Kurt Rowan
Assistant Examiner—Jeanne M. Elpel
Attorney, Agent, or Firm—Arnold, White & Durkee

[57] ABSTRACT

The invention comprises an apparatus which allows precision alignment of sheet-metal plates of various sizes and shapes such that two of those pieces can be conveyed properly past a laser beam welding device and welded together. This is accomplished by affixing each piece to be welded to a pallet which is adapted to be moved along a conveyance system up to and through the welding station. Prior to welding, each piece is carefully aligned and securely affixed to its pallet such that no further motion is possible during the welding process. Also disclosed are methods for loading and discharging the pieces from the pallets, for returning the pallets to the front end of the conveyance system, for combining several systems according to this invention so as to assemble three or more pieces by laser beam welding, and for finishing the assembled units.

8 Claims, 5 Drawing Sheets

APPARATUS FOR WELDING SHEET-METAL PLATES

BACKGROUND OF THE INVENTION

The invention relates to an apparatus for joining at least two sheet-metal plates by means of a weld seam which is produced by a laser beam welding device.

A device for the mechanical trimming of the ends of strips of sheet metal is previously known as described in EP-OS 0 151 848, which strips are subsequently welded together by means of a laser beam welding device. This device is only suitable for welding strip ends of sheet-metal coils together. It is not possible by use of such a device to weld together sheet-metal plates of differing geometric form and/or differing thickness, as is required, for example, in bodywork construction for the automotive industry.

SUMMARY OF THE INVENTION

It is an object of the present invention to provide an apparatus incorporating a laser welding device such that at least two sheet-metal plates of differing geometrical dimensions and/or differing thicknesses may be joined together efficiently and economically in large quantities and with clean formation of the laser beam welding seam.

By use of the device according to this invention, sheet-metal plates, as are used in particular in bodywork construction in the automotive industry, possibly with differing geometry and/or differing sheet-metal plate thicknesses, are joinable together cleanly by use of a laser beam welding process, while providing a high degree of productivity. Since the transverse length of the sheet-metal plates (measured orthogonal to the longitudinal direction of the welding seam) is often greater than the length of the welding seam, proper alignment of the plates for welding can be difficult. The apparatus in accordance with the invention is designed to assure proper alignment of the plates for welding such that practically all geometries and/or sheet-metal plate thicknesses occurring in bodywork construction for the automotive industry are weldable together by use of laser beam welding with this apparatus in large quantities and with a high commercial yield.

The invention comprises an apparatus which allows precision alignment of sheet-metal plates of various sizes and shapes such that two of those pieces can be conveyed properly past a laser beam welding device and welded together. This is accomplished by affixing each piece to be welded to a pallet which is adapted to be moved along a conveyance system up to and through the welding station. Prior to welding, each piece is carefully aligned and securely affixed to its pallet such that no further motion is possible during the welding process. Also disclosed are methods for loading and discharging the pieces from the pallets, for returning the pallets to the front end of the conveyance system, for combining several systems according to this invention so as to assemble three or more pieces by laser beam welding, and for finishing the assembled units.

The invention also makes it possible to join together more than two plates by, first, joining together by use of laser beam welding two sheet-metal plates in a device in accordance with the invention and, second, to subsequently send assembled units produced in such a way once again through a device in accordance with the invention, or to let them run through a secondary device constituted in accordance with the invention, where these assembled units are welded together into one unit by use of laser beam welding, producing a welded unit which includes four sheet-metal plates in total. The units produced in this way, assembled from two or more sheet-metal plates, may then be fed to further machining processes, such as embossing, seam cleaning, seam oiling, etc.

The pallets of this invention make possible a clean alignment of the sheet-metal plates relative to one another at all times independent of the geometry of the individual sheet-metal plates. The length of the seam relative to the transverse dimensions of the sheet-metal plates is insignificant for the forming of the seam quality, because the original sheet-metal plates are aligned and securely fixed to the individual pallets before being welded to one another.

In this manner it is possible to join together all shapes and sizes of sheet-metal plates occurring in practical operations, especially for automobile construction, since the arrangement and fixture of the plates on pallets makes possible very precise alignment of the individual components or sheet-metal plates relative to one another while being welded by means of the laser beam welding installation.

In a first preferred embodiment four sheet-metal pieces are welded together to form a single unit by use of this invention. First, two sets of two sheet-metal plates in each set are welded together on two conveyor devices in accordance with this invention which function parallel to one another. The two assembled plates are subsequently fed to a central conveyor line in accordance with this where the assembled units are welded to one another by the laser beam welding process, before being fed to secondary work processes. By so using this invention several times in sequence it is possible to assemble three or more separate plates together efficiently in large quantities.

Another embodiment of the invention relates to a device for subsequently processing or finishing the sheet-metal plates which have been joined together by means of the laser beam welding process of this invention. Such processes may include embossing, cleaning and oiling the assemblies which have been produced by this invention prior to being fed to their further intended uses, e.g. for installation in a vehicle body.

In yet another embodiment of the invention the pallets are conveyed synchronously to the laser beam welding device by a conveyor equipped with drivers in the zone of the laser beam welding device.

Another embodiment of the invention deals with the form of the pallets themselves. These can be adapted to the geometrical form of the sheet-metal plates to be joined together, in particular comprising suitable fixtures for stops, clamping devices, rollers, sliding pads, or the like.

According to yet another embodiment of the invention, the feed of individual sheet-metal plates or assembled units already joined together is effected by a stacking device from which they are conveyed onward by a robot to further processing operations.

BRIEF DESCRIPTION OF THE DRAWINGS

In the drawings the invention is illustrated partially diagrammatically by way of an example of a practical embodiment. The dimensions shown in the drawing are not intended to limit the invention; they are variable depending on the operating conditions and the task to be performed.

DETAILED DESCRIPTION OF THE PREFERRED EMBODIMENT

Figure 2:
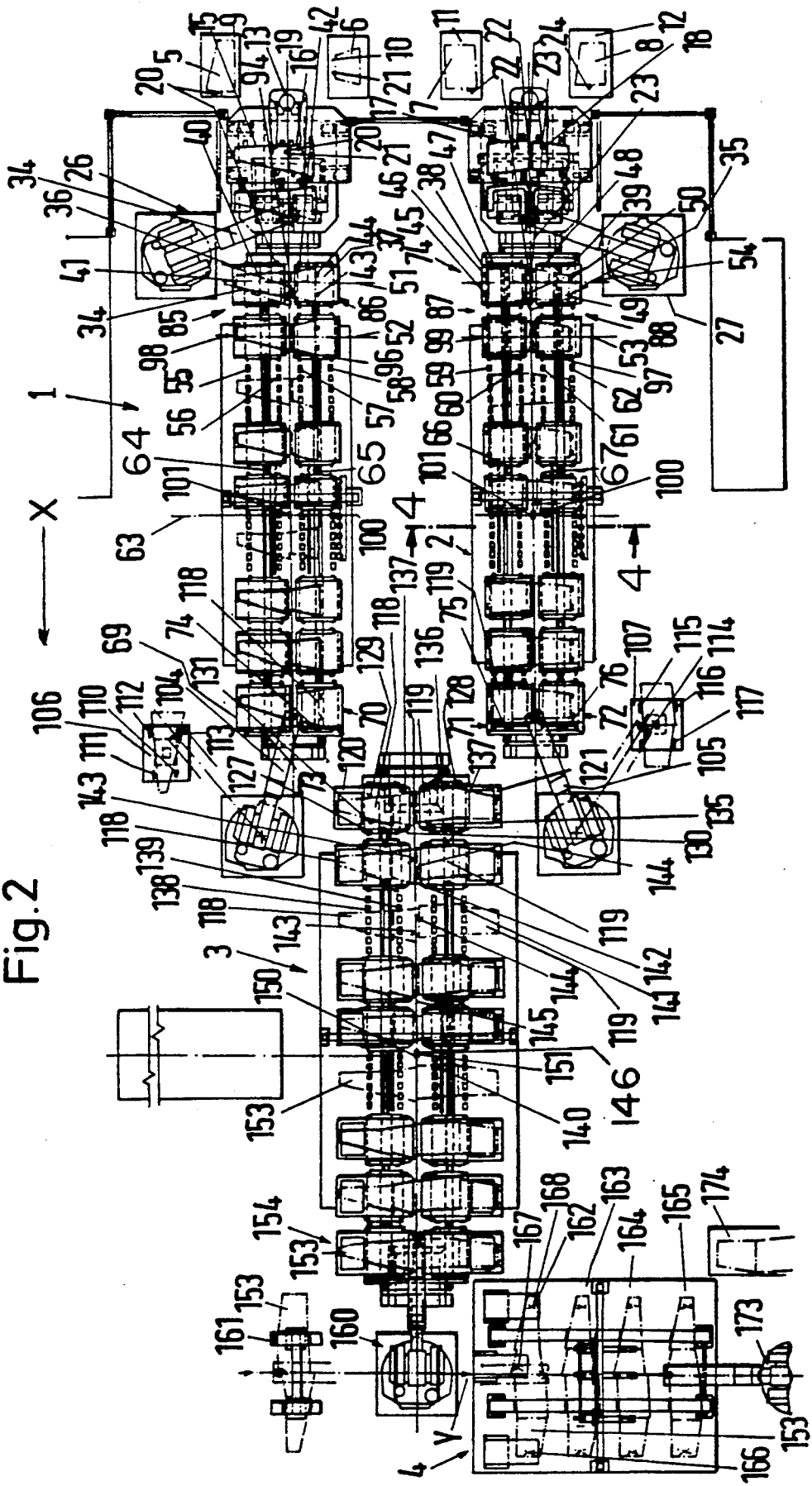
FIG. 2 is a plan view of the preferred embodiment shown in FIG. 1.

Referring to FIG. 2, the preferred embodiment of the present invention comprises conveyor systems 1 and 2 arranged parallel to one another. In the preferred embodiment, conveyor systems 1 and 2 are of equal length. A third conveyor system 3 is located at a predetermined distance downstream from conveyor systems 1 and 2, and is in turn operatively aligned with a fourth conveyor system 4 having a right-angled conveyor device.

Because conveyor systems 1 and 2 are substantially identical, this description will focus on system 1 to explain the operation of this portion of the invention. Throughout this description, reference numbers in parentheses refer to features of conveyor system 2 which correspond to the features of conveyor system 1 that are described. In each conveyor system, sheet-metal plates 5, 6 (7, 8) are to be joined together by means of a laser beam welding seam. The sheet-metal plates 5, 6 (7, 8) may have differing geometrical forms when viewed in plan. For example, sheet-metal plates 5, 6 and 8 comprise a basic trapezoidal shape when viewed in plan, while the sheet-metal plate 7 has roughly the shape of a parallelogram when viewed in plan.

The sheet-metal plates 5, 6 (7, 8) are fed one at a time on separated conveyor 9, 10 (11, 12) to the conveyor system 1 (2). Conveyor 9, 10 (11, 12) can be floor conveyors that are driven in a suitable way and manner, for example, operatable automatically by means of induction loops in the floor.

Figure 1:
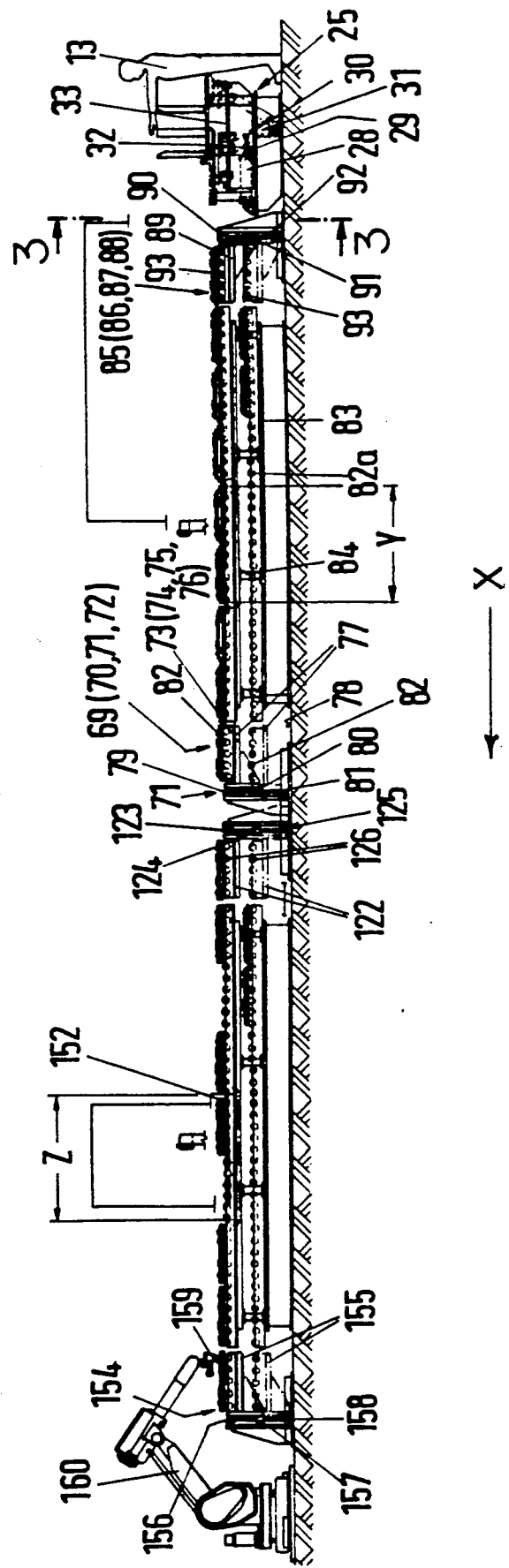
FIG. 1 is a side view of a preferred embodiment of the present invention.

Referring to FIGS. 1 and 2, sheet-metal plates 5, 6 (7, 8) are each removed by an operator 13 (14) and inserted from above in magazines 15, 16 (17, 18). In the case of the embodiment illustrated, the sheet-metal plates 5 are inserted into magazine 15 and the sheet-metal plates 6 into magazine 16, etc. Magazines 15, 16 (17, 18) are constructed such that sheet-metal plates 5, 6 (7, 8) fit into the respectively allocated magazine in terms of shape, so that no sheet-metal plates are insertable into the wrong magazines. In the case of the embodiment shown, the sheet-metal plate 5 (7) is always inserted into magazine 15 (18) to the right of the longitudinal center line 19 (23), in such a way that the base side 20 (22) comes to rest substantially parallel to the longitudinal center line 19 (23), while the sheet-metal plates 6 (8) are always inserted into magazine 16 (18) so that the base side 21 (24) is substantially parallel with the longitudinal center line 19 (23).

However, the insertion of the sheet-metal plates can also be effected by use of a robot (not shown) which, e.g. grasps the sheet-metal plates 5, 6 (7, 8) by use of suction pads and/or gripper arms and inserts these plates into the allocated magazines 15, 16 (17, 18). In this case a fully automated routine for the entire installation is achievable.

Figure 3:
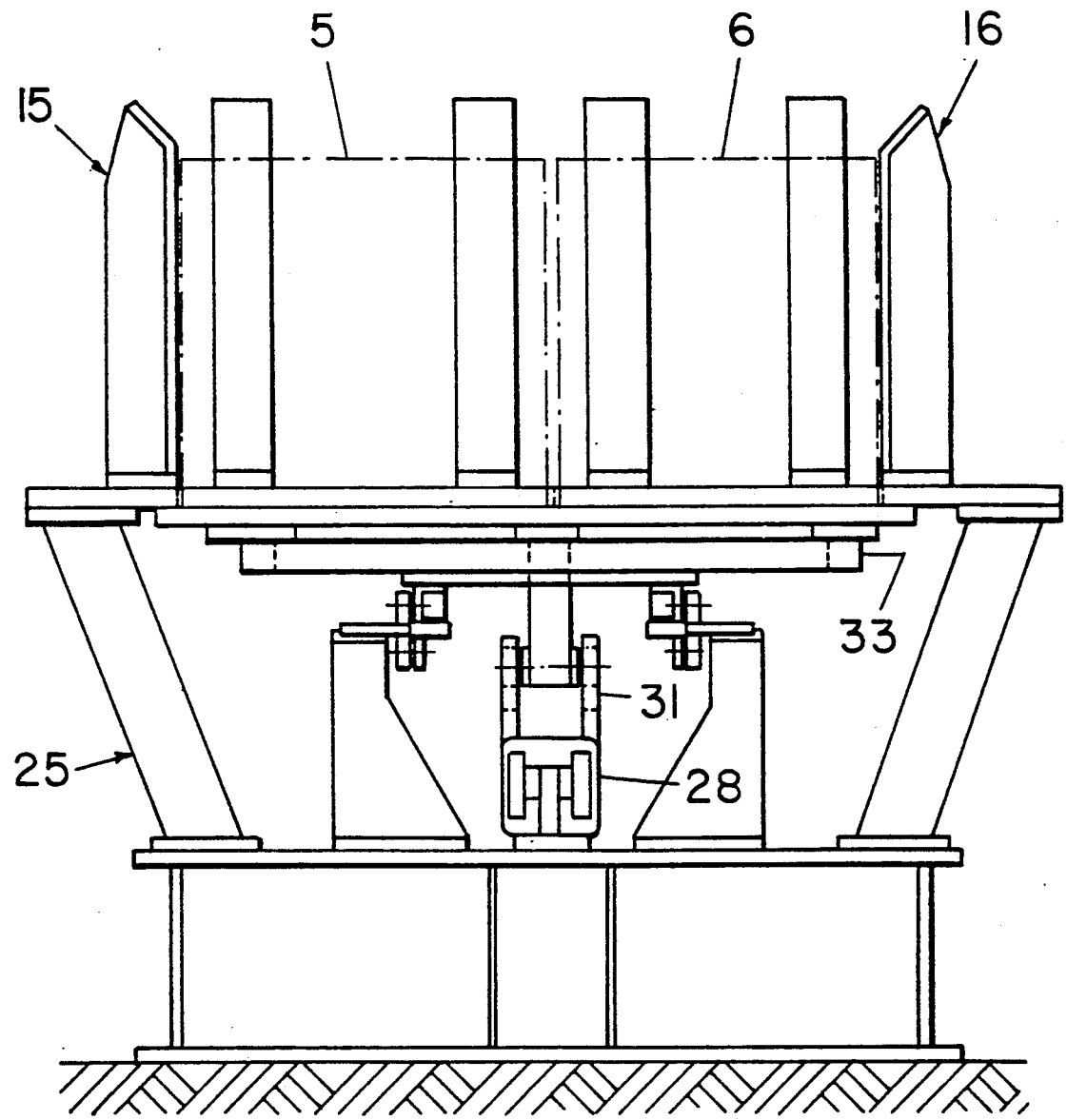
FIG. 3 is a sectional view through section A—A of FIG. 1, showing the sheet-metal plate magazines.

Underneath each magazine 15, 16 (17, 18) there is arranged in each case a suitable conveyor device 25 (FIGS. 1 and 3) which conveys the sheet-metal plates 5, 6 (7, 8) into the pickup zone of a robot 26 (27). In FIG. 1 such a conveying device is illustrated only diagrammatically in side view, while in FIG. 3 it is illustrated as an elevation on cross section A—A. It is driven by a piston-cylinder unit 28 which is hydraulically actuated alternately on both sides by means of pressure from a pressure medium (not shown), whose piston rod is joined via a link 30 with a rocker 31 which is joined via a connecting link guidance 32 with an elevating platform 33, by means of which the lower sheet-metal plate 5, 6 (7, 8) is able to be pushed out of magazines 15, 16 (17, 18) in the direction of conveyance X into the effective zone of the robot 26 (27) (FIG. 2). The sheet-metal stack then slide loads so that for each stroke of rocker 31 a new sheet-metal plate is available for transfer to the robot 26 (27).

Robot 26 (27) possesses a swivel arm 34 (35) which is able to pick up simultaneously or separately by means of suction pads or the like two sheet-metal plates 5, 6 (7, 8) and transfer them to pallets 36, 37 (38, 39). The transfer of the sheet-metal plates 5, 6 (7, 8) by robot 26 (27) thus takes place without alteration of the spatial orientation of the sheet-metal plates in relation to one another as was already determined by their placement in the magazines 15, 16 (17, 18).

The pallets 36, 37 (38, 39) include devices for fine adjustment and clamping of the plates in the style and manner yet to be described. Suitable stop and/or centering mechanisms are provided on pallets 36, 37 (38, 39) depending on the geometric form of the sheet-metal plates 5, 6 (7, 8) that are to be laid on and carried by them. In the embodiment shown in the Figures, for example, straightedge stops 40–44 (45–50) are illustrated. These straightedge stops 40–44 (45–50) can of course be replaced with other positioning and holding mechanisms, for example, rollers, cams, bevelled checks, spigots or the like. Such mechanisms should be selected as required to bring the sheet-metal plates 5, 6 (7, 8) into the correct spatial orientation or their respective pallets. Furthermore, the straightedge stops or the like 40–44 (45–50) can be constructed so as to be adjustable, so that they can be configured to accept all possible basic geometrical forms of sheet-metal plates 5, 6 (7, 8), thus expanding the utilization capability of the installation.

As soon as the sheet-metal plates 5, 6 (7, 8) have been correctly spatially oriented and positioned by the straightedge stops 40 to 44 (45–50), they are locked into place by means of clamping mechanisms (not shown) that are allocated to each pallet 36, 37 (38, 39), so that the position of each plate 5, 6 (7, 8) relative to its pallet is no longer changeable.

A plurality of such pallets 36, 37 (38, 39) are arranged one pair at a time and aligned relative to their longitudinal center axes 51, 52 (53, 54). Pallets 36, 37 (38, 39), and also the other pallets arranged on the conveyor system 1 (2), are moved forward by a suitable drive in the direction of conveyance X. The conveyor system 1 (2) comprises friction roller tracks 55, 56, 57, 58 (59, 60, 61, 62), which are driven by a motor (not shown) and on which the pallets 36, 37 rest and are driven along in the direction of conveyance X. The center of the laser beam welding device has been indicated at 63.

The laser beam welding device can be, for example, Trumpf Laser TLF model numbers 1500, 2000, 2500 or 6000 made by Firma Trumpf Lasertechnik GmbH, Ditzengen, Germany, or model designations RS 1200 SM, RS 1700 SM, RS 1700 RF, RS 2500 RF, RS 3000 RF, RS 5000 RF, RS 6000 RF, RS 825, RS 840 or RS 850 available from Firma Rofin Sinar Laser GmbH, Hamburg, Germany. The choice of a specific laser depends upon the metal strip thickness, weld cycle time and desired quality.

Figure 4:
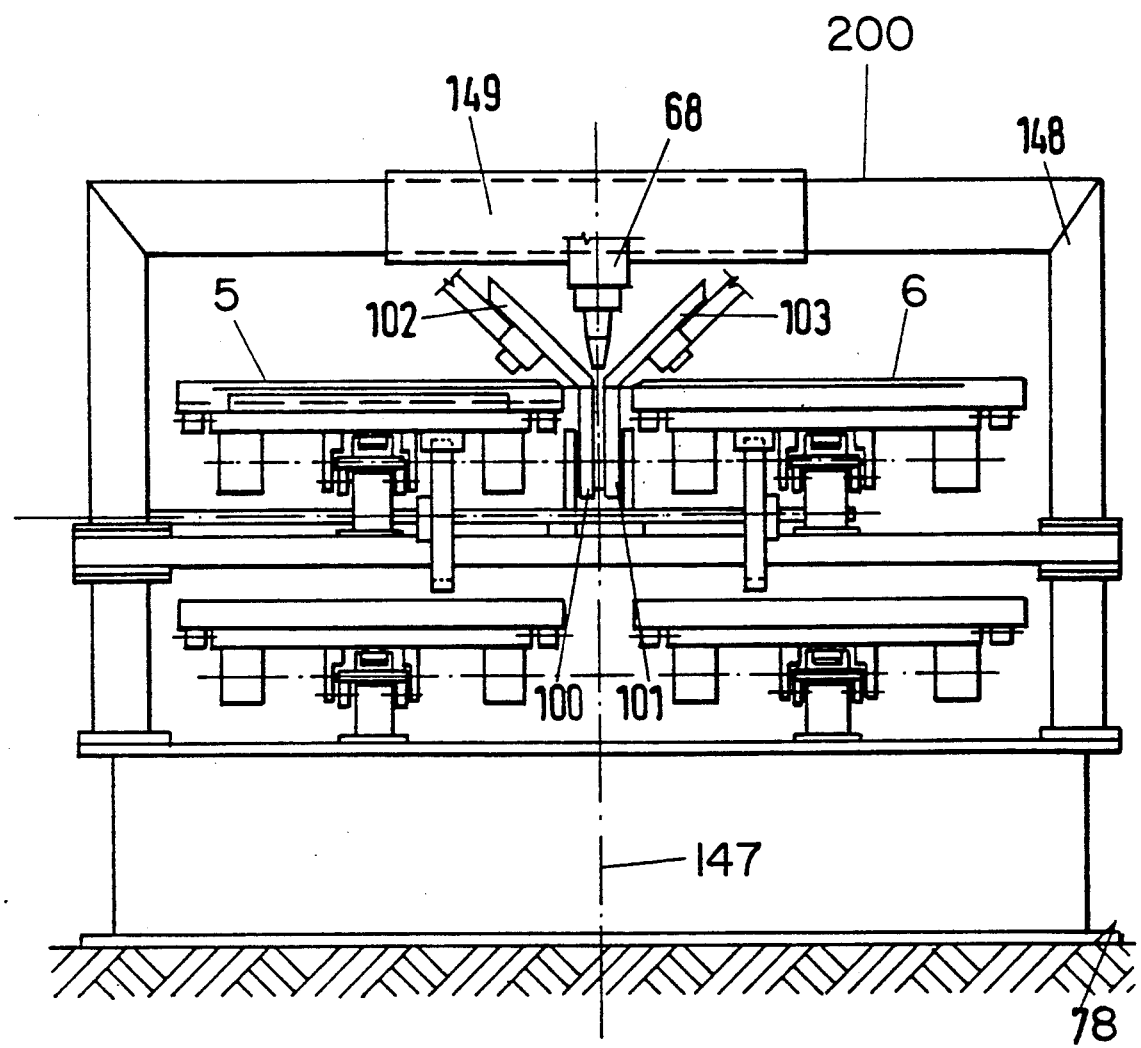
FIG. 4 is a sectional view through section B—B of FIG. 2, showing the laser beam welding device.

An additional conveyor device is arranged along the path length Y (FIG. 1) before and after the laser beam welding device, which device grips the respective pallets 36, 37 (38, 39) via finger-shaped drivers 64, 65 (66, 67), in order to guide the pallets synchronously to the laser beam welding device 68 (FIG. 4). With respect to their longitudinal center axes 51, 52 (53, 54), the pairs of pallets 36, 37 (38, 39) need not be arranged exactly coaxially to one another prior to the gripping of the pairs of pallets 36, 37 (38, 39) by the finger-shaped drivers 64, 65 (66, 67). Misalignment on the friction drive conveyor is quite possible due to the nature of the friction drive, but it is harmless because coaxiality during the laser beam welding procedure is enforced by the finger-shaped drivers 64, 65 (66, 67).

After having passed the laser beam welding device 63, the pallets 36, 37 (38, 39) are moved onward in the direction of conveyance X. They are released from the finger-shaped drivers 64, 65 (66, 67) and are driven along by the friction roller tracks 55-58 (59-62) up to a discharge station 69, 70 (71, 72) where the now single-piece sheet-metal plates 5, 6 (7, 8) are removed from the allocated pallets 36, 37 (38, 39) in the style and manner yet to be described and are further handled and treated in the style and manner also to be described.

Each discharge station 69, 70 (71, 72) comprises one elevating device 73, 74 (75, 76). It can be seen in FIG. 2 that each of these elevating devices 73, 74 (75, 76) has one elevating platform, whereby in FIG. 1 only one elevating platform with reference symbol 77 has been designated and illustrated in both its raised and lowered position. The elevating platform 77 is adjustable in height orthogonally to the floor 78 on which it is installed or to a foundation, and is guided by means of guidance sleeves on a guidance bar or the like. In FIG. 1 only the two guidance sleeves 79, 80 and the guidance bar 81 are designated. Further suitable guidance mechanisms, for example, guidance sleeves and guidance bars, can of course be provided in the plane behind this. It is also possible to use other suitable guidance and drive devices. For example, the guidance bars can be replaced by threaded spindle drives, instead of slideways, and the guidance sleeves can take the form of threaded nuts, which mesh with the guidance bars 81 arranged in the form of spindles. Instead of this, suitable piston-cylinder units can also be used which are actuatable alternately on both sides, to raise and lower the elevating platform, by means of pressure via a pressure medium, in particular hydraulically.

The elevating platforms 77 and all other elevating platforms comprise motor-driven friction roller tracks, of which in FIG. 1 only the friction roller track 82 has been designated by a reference symbol.

Upon arrival at the discharge station 69, 70 (71, 72), the pallets 36, 37 (38, 39) slide over from the friction roller tracks 55, 56, 57, 58 (59-62) onto the friction roller tracks 82 of the elevating platform 77. After the pallets 36, 37 (38, 39) have been discharged, the pallets are lowered by the elevating device 73, 74 (75, 76) to a level at which the friction roller tracks 82 of the elevating platform come to rest flush with the respective friction roller tracks 82a, which are arranged below friction roller tracks 55, 56, 57, 58 (59-62). Subsequently the friction roller tracks 82 of the elevating tables 77 and the following ones 82a are switched on and the pallets arranged thereon 36, 37 (38, 39), now empty, are conveyed away in the direction opposite to the direction of conveyance X. Of these lower friction roller tracks 82a only one friction roller track is designated by a reference symbol in FIG. 1. The lower friction roller tracks 82a are arranged such that each is below one of the upper friction roller tracks 55, 56, 57, 58 (59-62). For this purpose the conveyor system is provided with suitable supports 84 which hold the upper friction roller tracks 55-58 spaced at a distance from the steel frame 83 which supports the lower friction roller tracks, and thus from the lower friction roller tracks 82a themselves. Of these supports only one support is designated by the reference symbol 84 in FIG. 1. It is also perceivable from FIG. 1 that such supports 84 are arranged along the length of the conveyor system on both sides of the frame 83.

Empty pallets 36, 37 (38, 39) are thus conveyed back to the starting point of the conveyor system 1 (2) by the lower friction roller tracks 82a, where they are each fed to a friction roller track of one loading station 85, 86 (87, 88). Each loading station also comprises one elevating platform, whereby in FIG. 1 only one of these elevating platforms is designated by the reference symbol 89. This elevating platform 89 is constructed in principle like, for example, the elevating platform 77 and also comprises guidance sleeves 90 or respectively 91 which slide on a guidance bar. The guidance sleeves 90, 91 and the guidance bar 92 can be constructed like the corresponding guidance sleeves 79, 80 and the guidance bar 81. Furthermore, these guidance sleeves 90 to 92 can also be substituted by others, e.g. by spindles, piston-cylinder units or similar, as is described in conjunction with the discharge stations 69, 70 and their elevating platforms 77.

Each of the elevating platforms 89 comprises likewise a motor-driven friction roller track, of which, though, only the friction roller track 93 has been illustrated in FIG. 1. These friction roller tracks 93 are constructed the same as the friction roller track 82 located on the elevating platform at the discharge station.

The arriving empty pallets 36, 37 (38, 39) are pushed over onto the friction roller tracks 93 of the charging station and conveyed onward up to the stop on the elevating platforms 89. By this means the pallets 36, 37 (38, 39) are aligned transverse to the conveyance direction X so that coaxial alignment is achieved in relation to the common longitudinal center axes 51, 52 (53, 54) of the pallets 36, 37 (38, 39). As soon as the pallets 36, 37 (38, 39) have been driven onto the elevating platforms 89 up to the stop, the elevating platforms 89 are elevated until the friction roller tracks 93 are at the same height as the friction roller tracks 55-58 (59-62), so that the pallets 36, 37 (38-39) are in turn conveyable to the upper friction roller tracks 55-58 (59-62) by appropriate driving of the friction roller tracks 93, from which point the cycle then begins anew, i.e. the pallets 36, 37 (38, 39) are again loaded by the allocated robots 26 (27) with sheet-metal plates 5, 6 (7, 8).

After their arrangement on the pallets 36, 37 (38, 39) the sheet-metal plates 5, 6 (7, 8) are each arranged relative to one another so that there is a space 94 (95) (FIG. 2) between their base sides 20, 21 which are turned towards each other. During their conveyance in direction X, the pallets 36, 37 (38, 39) come into the area of a strip-shaped stop or straightedge 96 (97) where the edges of the sheet-metal plates 5, 6 (7, 8) to be welded together are aligned exactly with one another with respect to the later welding seam and are subsequently firmly clamped by means of clamping rollers, toggle lever clamping devices or similar in relation to the respectively allocated pallet 36, 37 (38, 39). For example, each of the pallets 36, 37 (38, 39) can comprise one inwardly pivotable pressure roller which is pressable from above onto the sheet-metal plate concerned 5, 6 (7, 8). Instead of this, several such pressure rollers can be provided. However, it is also possible to use other suitable locking means or clamping devices, e.g. toggle lever clamping devices, which are controllable and actuatable centrally by means of pressure via a pressure medium, in particular pneumatically, in order to clamp the sheet-metal plates 5, 6 (7, 8) securely onto the pallet.

After leaving this station, which is located in FIG. 2 in position two, the sheet-metal plates 5, 6 (7, 8) are firmly fixed relative to one another. This position has been illustrated in FIG. 2 without pallets. The sheet-metal plates 5, 6 (7, 8 ) do not of course rest on the friction roller tracks 55, 56, 57, 58 (59–62), but are still located on the pallets 36, 37 (38, 39), which are not all illustrated in the plan view in FIG. 2 purely for reasons of simplification, but are clearly recognizable in this position from the side view in FIG. 1.

To accomplish exact alignment of the edges to be welded, at least one pallet at a time, e.g. 36 (38), can be pushed in the direction of the arrow 98 (99) up against the straight edge 96 (97). However, it is advantageous if pallets 36, 37 (38, 39) which belong together in pairs are slidable up against the allocated straightedge 96 (97). For this purpose each pallet 36, 37 (38, 39) can be constructed as a trolley so that its upper platform-shaped clamping surface is slidable relative to the subsurface on rollers, guide rails or suchlike, and is lockable in the respectively desired position.

After leaving the straightedge zone 96 (97) the sheet-metal plates 5, 6 (7, 8) are aligned with one another so that any inaccuracies incurred when the sheet-metal plates 5, 6 (7, 8) are deposited on the allocated pallets 36, 37 (38, 39) are rectified. In this way it is also possible amongst other things to control varying geometries of the sheet-metal plates 5, 6 (7, 8) without further ado in order to produce clean welding seams, as are required for automotive bodywork construction or the like. The sheet-metal plates 5, 6 (7, 8) are thus so aligned after leaving the straightedge 96 that they are later able to be butted flush up against each other, even in the case of sheet-metal plates of differing thickness.

Shortly prior to passing the laser beam welding device 68, the sheet-metal plates 5, 6 (7, 8) are moved flush up against each other at their front ends by means of appropriate adjustment of those parts of the pallets 36, 37 (38, 39) provided for this purpose. The pallets 36, 37 (38, 39) are then locked in this position and fed to the laser beam welding device 68.

Referring to FIG. 4, two pad and guidance rollers 100, 101 are arranged in the area of the laser beam welding device 68 beneath the sheet-metal plates 5, 6 with a space between the rollers and with horizontal rotating axes. These rollers, while rolling, support the sheet-metal plates 5, 6 (7, 8) from below on both sides of the seam to be produced. A further pad and guidance roller 102 or respectively 103 is arranged to contact each sheet metal plate from above. These upper rollers 102, 103 are arranged at angles of about 45° from vertical, and they support the sheet-metal plates 5, 6 from above on both sides of the welding seam in the same zone in which the pad and guidance rollers 100, 101 come into contact from below. Hence the upper pad and guidance rollers 102 and 103 form an angle of about 90° with respect to one another (FIG. 4) through which the laser beam welding system 68 reaches and continuously welds the sheet-metal plates 5, 6 (7, 8) during conveyance through the welding apparatus.

After passing the laser beam welding device 68, each pair of sheet-metal plates 5, 6 (7, 8) represents a uniform assembly unit which is able to be handled as a single piece. This uniform assembly unit is illustrated in FIG. 2, after the laser beam welding device 68, without pallets 36, 37 (38, 39). This uniform assembly unit is of course still located on the pallets 36, 37 (38, 39). The pallets 36, 37 (38, 39) have been omitted purely for reasons of simplifying the drawing. At the end of the respective conveyor system 1 the uniform assembly unit is removed from the discharge stations 69, 70 (71, 72) by a robot 104 and either fed to a deposition point 106 (107) for visual inspection, or transferred to the charging stations for another conveyor system 3. Deposition of the assembly units on deposition points 106 (107) need not be undertaken for each assembly unit. It can rather be determined before hand that only a certain number of assembly units, for example by random sampling, are deposited on the deposition point 106 for the purpose of visual seam inspection.

The deposition point 106 (107) comprises suitable centering stops 110, 111, 112, 113 (114–117) so that it is possible to deposit the assembly units in the same position on the deposition point 106 (107) by means of robot 104 (105).

Referring to FIG. 2, the assembly units 118, 119 grasped by the robots 104, 105 either from the deposition points 106, 107 or from the conveying systems 1, 2 are fed to loading stations 120, 121 which comprise the same construction as the loading stations 85–88. Again, the loading stations 120, 121 comprise one elevating platform each, of which only one of the elevating platforms is shown in FIG. 1 by the reference symbol 122. The elevating platform 122 is adjustable in height orthogonal to the floor or respectively to the foundation 78 and is also lockable in the desired height position. Height adjustment can take place in the style and manner as was described with respect to loading stations 85–88 and their elevating platforms, i.e. again by means of an electric motor via a spindle drive, or e.g. piston-cylinder units can be used which are actuated alternately on both faces by means of pressure via a pressure medium, e.g. hydraulically.

Only two guidance sleeves 123, 124 are illustrated in FIG. 1, which sleeves are guided on a guide bar 125. The guidance sleeves 123, 124 can again be constituted as spindle nuts which comb together with guidance bar 125 then constructed in the form of a spindle. In the plane behind this drawing, several such guidance sleeves, guidance bars or the like are arrangeable in order to reliably drive and guide the elevating platform 122.

The elevating platforms 122 comprise motor-driven friction roller tracks, of which only the friction roller track 126 is recognizable in FIG. 1. One pallet each 127, 128 is arranged on the friction roller tracks 126, which in principle may comprise the same constitution and arrangement as the pallets 36–39. In any case the pallets 127, 128 are so constituted and arranged that they are again in a position to accommodate the assembly units 118, 119. For this purpose the pallets 127, 128 comprise stops or guidance means 129, 130, 131, 134 Or respectively 135, 136, 137 which are adjustable and/or settable where required. These stops or the like make possible an exact location of the assembly units 118, 119 on the pallets 127, 128. Rollers, roller tracks, stop elements or the like can be used instead of stops. The stops or the like can be constituted so as to be adjustable and blockable, in order to be able to align assembly units of differing geometric configuration with the pallets 127, 128.

After moving the elevating platform 122 to a level at which the friction roller tracks 126 and the following ones of the elevating platform 122 concerned are flush with friction roller tracks 138, 139, 140, 141, the laden pallets 127, 128 are discharged by conveyor onto the friction roller tracks 138 to 141 and moved onwards by the latter by switching on the motorized drive of the friction roller tracks 126 and the following ones. The friction roller tracks 138–141 are again motor driven.

A strip-shaped stop or straightedge is designated by the reference symbol 142. The assembly units 118, 119 can be brought in to contact with the straightedge 142, with their sides to be welded together 143, 144 facing one another, by motorized sliding of the parts of the pallets concerned, as in the case of pallets 36, 37, 38, 39. After having left the straightedge 142, the sides to be welded 143, 144 are thus aligned level and parallel to one another. In these positions a space 145 is still present between the assembly units 118, 119.

After alignment of the assembly units 118, 119 against straightedge 142, the assembly units 118, 119 are clamped, e.g. by means (not shown) of pressure rollers acting upon the upper sides of the assembly units 118, 119, or by means of toggle lever clamping devices or the like, relative to the transversely adjustable part of the pallets 127, 128, so that the assembly units 118, 119 can no longer change their position on the pallets.

Pallets are present even after leaving the straightedge 142. Although no pallets have been drawn in the station in FIG. 2 after leaving the straightedge 142 for reasons of simplifying the drawing, pallets are in fact present there.

Shortly before passing a laser beam welding device 146 the transversely adjustable parts of the pallets 127, 128 are shifted transversely to the direction of pass X towards each other, in such a way that the edges to be welded together 143, 144 butt flush against each other.

The laser 146 can be constructed as was described in conjunction with FIG. 4, and in conjunction with laser 68.

Referring to FIG. 4, the center of the laser 68 has been designated by reference symbol 147. The laser 68 can be slidable orthogonal to the direction of pass of the sheet metal plates and pallets X on a portal type of construction or suchlike, as is described below in conjunction with FIG. 4.

The laser 68 of conveyor systems 1, 2 is arranged on a portal construction 148 and is slidable orthogonal (transverse) to the direction of conveyance X. As is shown in FIG. 4, the portal construction 148 spans the friction roller tracks 55, 56, 57, 58 (59–62) and the pallets 36, 37 (38, 39) and sheet metal plates 5, 6 (7, 8) located on them. The portal construction 148 is supported by supports incorporated into the conveyor system 1, 2 structure such that adequate clearance is provided for proper operation of the main and return conveyor systems beneath the horizontal member 200 of the portal construction.

The laser 68 may be suspended on an assembly 149 which is transversely slidable along the horizontal member 200.

The laser 146 operating with conveyor system 3 can also be constructed in this way. The portal construction (not shown) spans the friction roller tracks 138, 139, 140, 141 and is spaced at a distance above the pallets and the assembly units 118, 119 located on them.

On this conveyor system 3 pad and guidance rollers are again provided, which, while rolling, support from below the assembly units 118, 119 on both sides of the sheet-metal seam, while from above guidance and pad rollers are provided which are constructed and arranged in a like way as has been described in conjunction with FIG. 4 and the laser 68 of conveyor system 1. The guidance and pad rollers 150, 151 are recognizable in FIG. 2.

In the area of the laser beam welding device 146 a conveyor is again provided along the dimension Z (FIG. 1), which conveyor comprises finger-shaped drivers 152 and the following ones, by which means the synchronous motion in pairs of two pallets 127, 128 at a time with the assembly units 118, 119 located on them is enforced by the laser beam welding system 146. In this case, by in pairs is meant in all embodiments that one assembly unit each is arranged on one pallet each on each side of the longitudinal center axis, seen in direction of conveyance X. A "pair" thus relates to two pallets with two assembly units arranged upon them transversely to the direction of conveyance X.

The assembly units 118, 119 are welded together by the laser beam welding device 146. Subsequently the driver fingers 152 transfer the pallets to the friction roller tracks 138, 139, 140, 141 which then convey the uniform assembly unit 153 onward in the direction of conveyance X until it reaches a discharge station 154, which may comprise the same construction and arrangement as the discharge stations 69, 70, 71, 72.

The discharge station again comprises an elevating platform 155 which is adjustable in height orthogonal relative to the floor 78 and may comprise the same construction and arrangement as the elevating platforms 77 of the discharge stations 69, 70, 71, 72 of the first and second conveyor systems 1, 2, i.e. the elevating platform again comprises guidance sleeves 156, 157 and a guidance bar 158 and where required several guidance sleeves and guidance bars in the plane behind that which is shown. Instead of this, piston-cylinder units or other suitable means can also be used, e.g. spindle drives, as has already been described in conjunction with the other elevating platforms of the discharge stations 69–72.

The assembly units 153 are removed from the discharge station by the gripper 159 of a robot 160 and fed either to a deposition point 161 or to conveyor system 4. A visual seam inspection of the welding seam can be carried out at the deposition point 161. For this purpose either all assembly units 153 can be subjected to a visual inspection, or only random samples, e.g. each tenth assembly unit, is deposited here in order to carry out the visual seam inspection, whilst all other assembly units are fed directly to conveyor system 4 by means of robot 160.

Once all desired welding operations are completed, further operations can be conducted on the assembly units which comprise 2 or more sheet-metal plates welded together. Referring to FIG. 2, the final assembly units 153 are removed from the final welding conveyor 3 discharge station 154 by a robot 160, and placed on conveyor system 4. All or a selected sample of the final assembly units 153 may be placed on inspection station 161 prior to being transferred to conveyor system 4. Once placed on conveyor system 4, the assembly units are conveyed in direction Y to various stations where selected finishing operations are performed. In the case of the embodiment illustrated in FIGS. 2 and 5, conveyor system 4 comprises four stations, namely 162, 163, 164 and 165.

In the embodiment described, at station 162 the assembly units 153 are provided in positions 166, 167 and 168 with beading by means of embossing. The beading can of course be arranged elsewhere as desired. For example, the assembly unit 153 can serve as a floor panel in a vehicle body, in which the beadings 166, 167 and 168 are embossed in the positions necessary for this.

Figure 5:
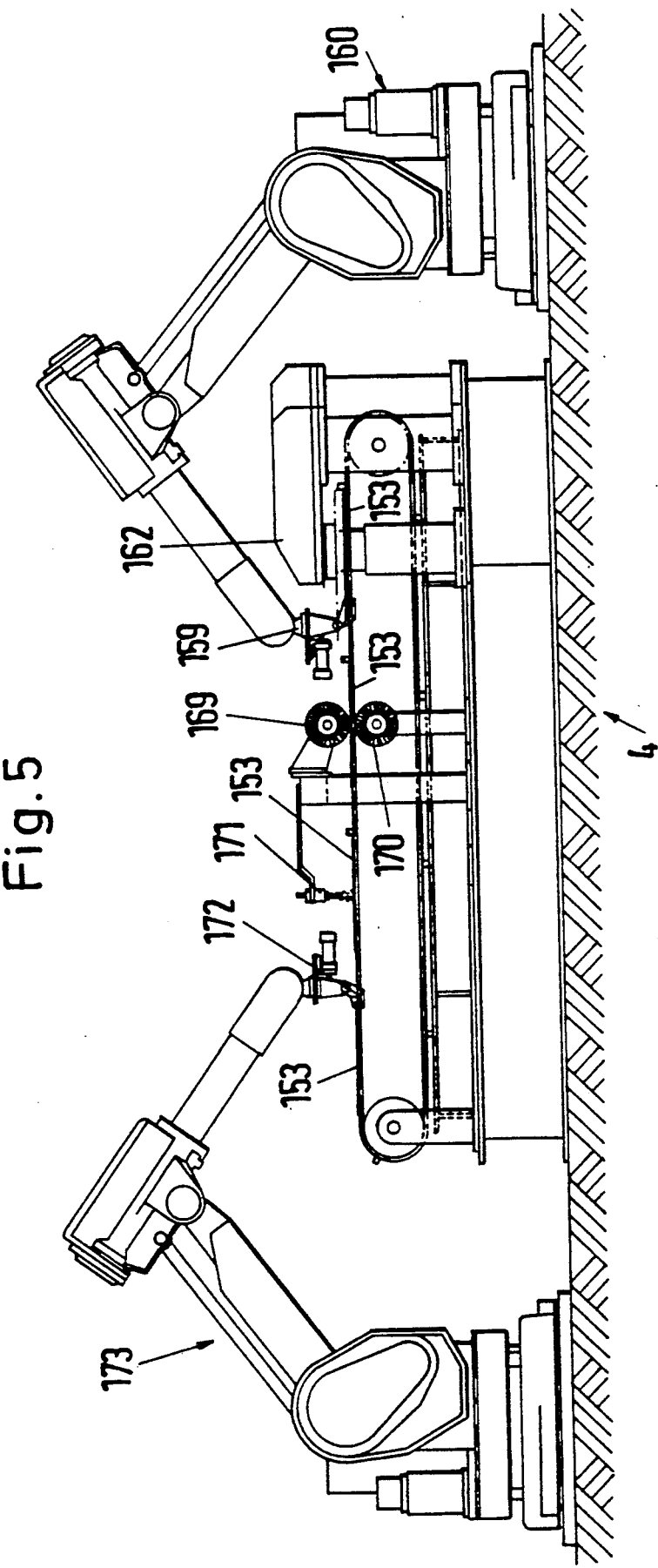
FIG. 5 is an elevation in the direction of arrow R of FIG. 2, showing the embossing, cleaning, oiling and removal stations.

The welding seams are cleaned at station 163. The device required for this purpose is shown in FIG. 5, in which pairs of steel brushes 169, 170 are arranged in the area of the welding seams. These steel brushes are rotated by suitable driving means (not shown), and they operate to mechanically machine the welding seams from above and below.

The cleaned welding seams are oiled at station 164. An oil spraying device is illustrated at 171 in FIG. 5.

Station 165 represents the removal station for the finished assembly units 153. There the finished assembly units 153 are removed by a gripper 172 of a robot 173 and stacked at 174.

The features described in the abstract, in the description and in the patent claims, and the features visible in the drawings can be significant for the realization of the invention both individually and in random combinations.

I claim:

1. An apparatus for laser beam welding at least two metal sheets, comprising:
    a first synchronized conveyor system having a first and a second end;
    pairs of pallets adjacent to one another and conveyable on said first conveyor system in a direction of conveyance along a conveying path, each of said pallets capable of supporting a sheet metal plate to be welded;
    means for loading sheet metal plates onto said pairs of pallets at said first end of said first conveyor system;
    a straight edge located between said pairs of pallets to align edges of sheet-metal plates carried on said pairs of pallets for welding;
    means for clamping sheet-metal plates on said pallets after alignment by said straight edge;
    means for moving said pallets orthogonal to said direction of conveyance to abut aligned edges of sheet metal plates carried by an adjacent pair of said pairs of pallets;
    a laser beam welding apparatus for welding said aligned and abutted edges of said sheet-metal plates;
    means for discharging welded sheet metal plates from a second end of said first conveyor system; and
    said first conveyor system further comprising means for returning said pairs of pallets from said second end to said first end of said first conveyor system along a return path beneath said conveying path.

2. The apparatus according to claim 1, further comprising:
    a second synchronized conveyor system, constructed substantially identical to said first synchronized conveyor system, for conveying and welding sheet metal plates in a direction substantially parallel to said direction of conveyance of said first synchronized conveyor system; and
    a third synchronized conveyor system, constructed substantially identical to said first and second synchronized conveyor systems, and having a first end located adjacent second ends of said first and second synchronized conveyor systems, for conveying and welding sheet metal plates that have been welded and conveyed by said first and second synchronized conveyor systems.

3. The apparatus according to claim 2, further comprising a post-processing apparatus, located adjacent a second end of said third conveyor system, for further processing sheet metal plates welded by said third conveyor system.

4. The apparatus according to claim 1, said first synchronized conveyor system further comprising finger-shaped drivers for conveying said pallets synchronously through said laser beam welding apparatus.

5. The apparatus according to claim 1, wherein each of said pallets comprise an upper clamping surface, and a lower portion drivable by said first conveyor system, said upper clamping surface being movable relative to said lower portion transverse to said direction of conveyance.

6. The apparatus according to claim 1, said first synchronized conveyor system further comprising:
    friction roller tracks for conveying said pairs of pallets from said first end of said first synchronized conveyor system to said laser beam welding apparatus;
    a transfer device for conveying said pairs of pallets from said first friction roller tracks through said laser beam welding apparatus;
    second friction roller tracks for transferring said pairs of pallets from said transfer device to said second end of said first synchronized conveyor system;
    a loading station adjacent said first end of said synchronized conveyor system for raising pairs of pallets from said return path to said first end of said first conveyor system; and
    a loading station adjacent said second end of said first conveyor system for lowering pairs of pallets from said second end of said conveyor system to said return path.

7. The apparatus according to claim 1, further comprising:
    a stacking platform for holding stacked sheet-metal plates to be welded; and
    means for removing sheet metal plates from a bottom of said stacked sheet-metal plates for placement on pallets located at said first end of said first conveyor system.

8. The apparatus according to claim 1, said laser beam welding apparatus further comprising:
    guidance rollers for supporting and guiding sheet-metal plates being welded.

* * * * *